United States Patent [19]

Carroll et al.

[11] Patent Number: 5,072,913
[45] Date of Patent: Dec. 17, 1991

[54] SPRING LOADED LOCKING HANDLE FOR ANGLE COCK OR THE LIKE

[75] Inventors: John B. Carroll, Irwin; Robert T. Sarsfield, Jeannette, both of Pa.

[73] Assignee: Westinghouse Air Brake Company, Wilmerding, Pa.

[21] Appl. No.: 684,112

[22] Filed: Apr. 12, 1991

[51] Int. Cl.$^5$ .............................................. F16K 35/02
[52] U.S. Cl. ........................................ 251/99; 16/112; 16/DIG. 36; 74/523; 74/526; 74/543; 251/243; 251/288; 267/155
[58] Field of Search ........ 16/112, DIG. 30, DIG. 36; 251/95, 98, 99, 107, 108, 109, 114, 115, 116, 242, 243, 244, 288, 315; 74/523, 526, 543; 267/154, 155, 156, 157, 166, 167

[56] References Cited

U.S. PATENT DOCUMENTS

| 952,121 | 3/1910 | Koehler | 251/99 |
|---|---|---|---|
| 952,743 | 3/1910 | Jenkins | 251/99 |
| 979,344 | 12/1910 | Shallow | 267/155 |
| 1,035,490 | 8/1912 | Stott et al. | 251/99 |
| 2,065,750 | 12/1936 | Safford | 251/99 |
| 2,147,287 | 2/1939 | Farmer | 251/109 |
| 4,456,219 | 6/1984 | Scott et al. | 251/99 |
| 4,909,275 | 3/1990 | Massey et al. | 251/95 |

FOREIGN PATENT DOCUMENTS 180371 5/1922 United Kingdom ................ 251/95

Primary Examiner—George L. Walton
Attorney, Agent, or Firm—J. B. Sotak

[57] ABSTRACT

A spring loaded locking handle assembly for an angle cock or the like wherein the helical windings of a torsion type spring are mounted on a fulcrum pin about which the handle proper of a two-piece, locking style handle assembly is pivotally connected to the handle socket. One leg of the torsion spring is fixed to the socket via a pilot hole therein and an aligned index hole in the fulcrum pin to properly locate and secure the fulcrum pin in place. The other leg of the torsion spring bears against the handle proper under tension to positively maintain the handle member in its locked position and to prevent accidental operation of the angle cock.

16 Claims, 3 Drawing Sheets

SPRING LOADED LOCKING HANDLE FOR ANGLE COCK OR THE LIKE

BACKGROUND OF THE INVENTION

The present invention relates to locking handles for angle cocks and the like, and particularly to spring-loaded locking handles that more effectively maintain the handle in a locked condition in order to prevent accidental operation of the angle cock.

Locking style handles are well-known and widely employed in the railway industry, one example of such use being on angle cocks that are designed for application to the ends of the brake pipe on a railroad car. The cock provides a means for attaching the brake pipe hose via which the respective car brake pipes in a train are connected. Either a ball cock or tapered plug is typically employed for the valve unit, which is normally open to conduct movement of the compressed air in the brake pipe line, and is closed on the end of the brake pipe at the last car of a train. The valve unit is open when the locking handle is parallel to the brake pipe line and is closed when the handle is transverse to the brake pipe line. The handle is designed to lock in both the open and closed positions. In the locked position, rotation of the handle is prevented by interference between locking lugs on the handle and body. In order to operate the valve by rotating the handle, the handle must first be raised slightly to clear the respective locking lugs. This self-locking feature relies on gravity to maintain the handle in its locked position, in which accidental opening or closing of the valve is prevented.

Where specialty type railway cars require unusual runs of the brake pipe, the angle cocks may be situated such that the angle cock must be mounted with the handle disposed sideways, or may even be mounted with the handle on its underside. In such installations, the effect of gravity, particularly when combined with the vibration encountered in railway service, tends to unlock the handle, thereby rendering the angle cock susceptible to accidental opening and closing.

SUMMARY OF THE INVENTION

The object of the present invention is to provide a simple, low-cost, yet reliable, spring-loaded locking handle that is suitable for use with a standard, A.A.R. approved angle cock.

The objective of the invention is fulfilled by means of a torsion type coil spring that is mounted on a fulcrum pin fixed on the mounting lug of the handle socket member. The handle is pivotally connected to the fulcrum pin to accommodate raising the handle relative to its socket, which is fixed to a valve operating stem that projects from the valve body. In the raised position, the handle locking lugs clear corresponding locking lugs on the valve body to permit handle rotation between open and closed valve positions of the valve operating stem. In the lowered position, the respective locking lugs lock the handle against rotation between the open and closed valve positions. One leg of the torsion spring is fixed in the mounting lug of the socket member, while the other leg is hooked over the handle, so as to impart spring force on the handle toward its locked position.

BRIEF EXPLANATION OF THE DRAWINGS

This objective and attendant advantageous features of the invention will become apparent from the following more detailed explanation when taken in conjunction with the accompanying drawings in which.

DESCRIPTION AND OPERATION

Figure 1:
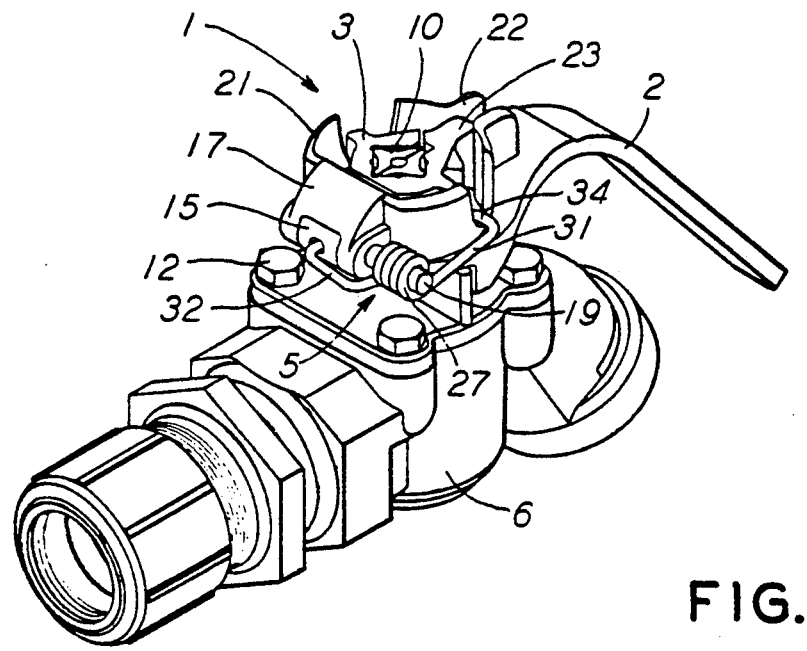
FIG. 1 is an isometric view of an A.A.R. approved ball type angle cock modified by the installation of the torsion spring of the present invention in the locking handle assembly.

In accordance with the present invention, there is shown in the drawings a typical angle cock having a locking handle assembly 1 including a handle member 2, a handle socket 3, a valve body cover 4 and a torsion type, handle return spring 5. Contained within the angle cock body 6 is a ball cock 7, ball seal segments 8—8' and a ball cock key 9 having a generally square shaped end portion 10 that projects through opening 11 in cover 4 when the cover is secured in place on body 6 by cap screws 12.

An opening 13 in handle socket conforms generally with the square-shaped end 10 of key 9 so that socket 3 fits over the cock key and is rotatably locked thereto. A rivet 14 is driven through a hole in socket 3 and an aligned slot in key 9 to maintain proper axial alignment therebetween.

Socket 3 further includes a handle connecting lug 15 that projects from the body of socket 3 and which is provided with a through bore 16 that is generally perpendicular to the axis of socket 3. A bifurcated mounting lug 17 on handle member 2 having through openings 18 receives lug 15 and is pivotally connected thereto by a fulcrum pin 19 that passes through the aligned bore 16 and openings 18. Handle socket 3 nests within a generally circular opening 20 of handle member 2 delineated by an upraised web 21. A vertical pocket 22 is formed in web 21 in which a nose 23 formed on socket 3 is slidably disposed. The pivot connection between handle member 2 and socket 3 allows handle 2 to be raised from a locked position, in which it is shown, to an unlocked position. Nose 23 is contained within pocket 22 through this range of handle lift in order to transfer handle rotation to socket 3 and ultimately to ball valve 7 via valve operating stem 9.

The underside of handle member 2 is formed with a pair of depending lugs 24 that are displaced approximately 180° apart. Cover 4 is formed on its top surface with a pair of upraised stops 25 that lie in the path of travel of locking lugs 24 when handle 2 is in its locked position to thereby impede rotation of handle 2 from an open to a closed position, except when handle 2 is raised up to an unlocked position, in which locking lugs 24 are free to pass over stops 25.

Another stop 26 is upraised from the surface of cover 4 and lies approximately mid-way between stops 25. This stop 26 lies in the path of travel of one locking lug 24, when handle 2 is in its locked position to thereby impede rotation of handle 2 from a closed to an open position, except when handle 2 is raised up to an unlocked position, in which the one locking lug 24 is free to pass over stop 26.

The length of fulcrum pin 19 is such that one end thereof projects from bifurcated mounting lug 17, on which end the plurality of helical windings comprising a coil portion 27 of torsion spring 5 is mounted. Fulcrum pin 19 has an index hole 28 drilled in it that is perpendicular to the pin axis. When this index hole is aligned with a corresponding pilot hole 29 in handle connecting lug 15 of socket 3, the axial location of fulcrum pin 19 is established. The axis of this pilot hole 29 lies in a plane Z that includes the axis of bore 16 in lug 15 and which is perpendicular to the axis of socket 3.

Figure 5:
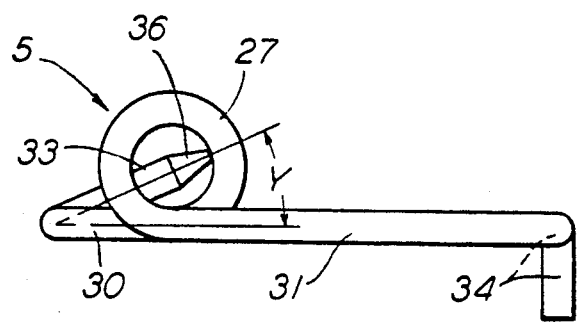
FIG. 5 is an enlarged side elevation view in outline of the torsion spring of the present invention shown in its free state prior to installation in the handle assembly.
Figure 6:
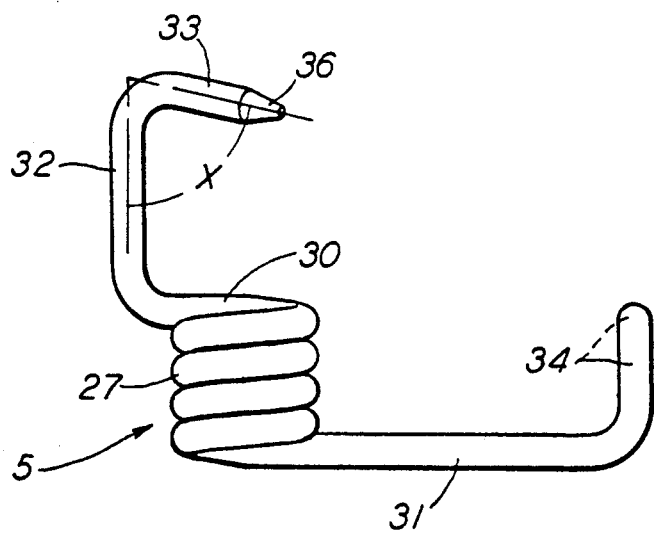
FIG. 6 is an enlarged plan view in outline of the torsion spring of the present invention shown in its free state prior to installation in the handle assembly.
Figure 2:
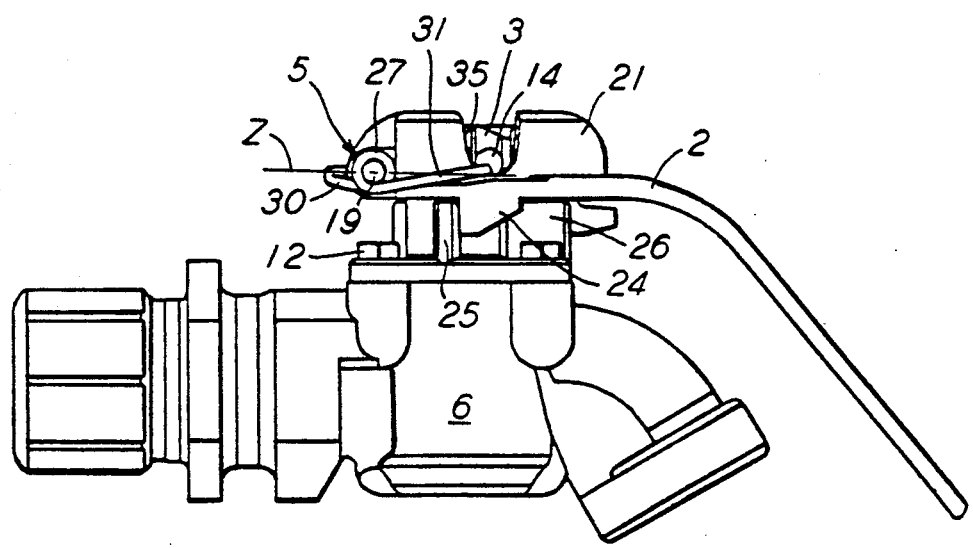
FIG. 2 is a side elevation outline view of the ball angle cock shown in FIG. 1, including the torsion spring of the present invention installed in the handle assembly.

Looking now at FIG. 6, spring 5 includes a leg 30 at one axial end of coil 27 and a leg 31 at the other axial end of coil 27. These legs 30, 31 extend in opposite direction from coil 27, with leg 30 having a generally U-shaped configuration in which a bight portion 32 lies intermediate the coil and a terminus segment 33, the terminus segment having an included angle X with bight portion 32 that is less than 90°. In FIG. 5, it can be seen that legs 30, 31 of spring 5 lie in a common plane that is tangent with the helical windings of coil portion 27. However, the terminus segment of leg 30 also lies at such an angle Y with leg 30 proper, that its axis intersects the axis of the helical windings forming coil 27. Leg 31 is formed with a hooked end 34, it being understood that spring 5, in the drawings of FIGS. 5 and 6, is shown in its free or unstressed state.

Figure 3:
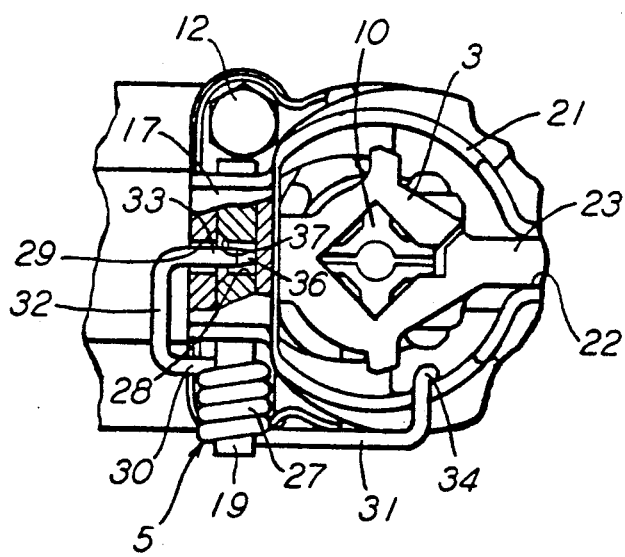
FIG. 3 is an enlarged fragmentary plan view of FIG. 2 partially in section showing the manner in which the fulcrum pin is retained in its proper position by the torsion spring of the invention.
Figure 4:
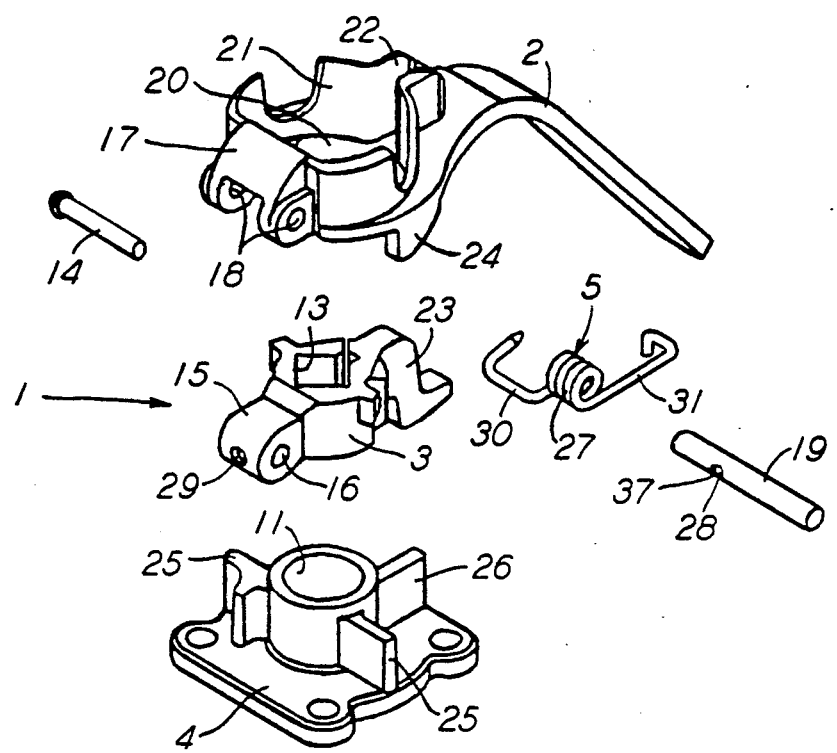
FIG. 4 is an exploded isometric view of the ball angle cock shown in FIG. 1, including the torsion spring of the present invention.
Figure 4:
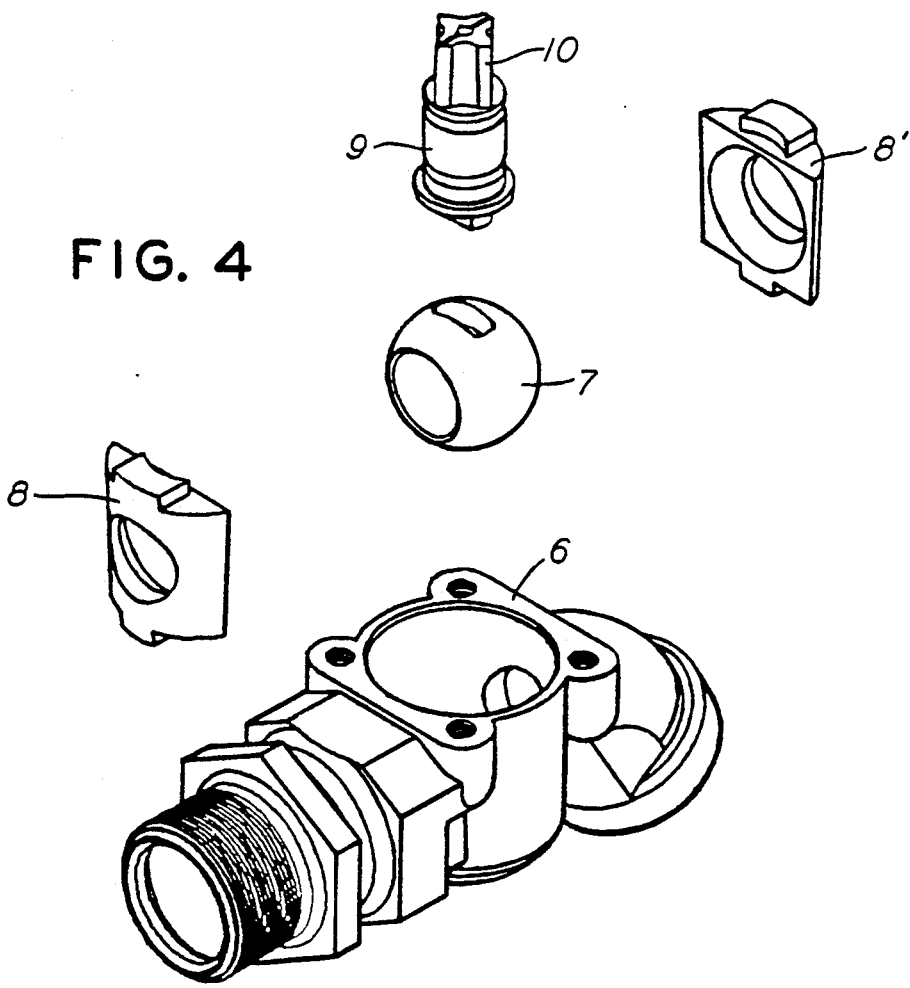

As shown in FIG. 3, terminus segment 33 of leg 30 is disposed in both pilot hole 29 and index hole 28. This serves the dual function of fixing leg 30 to socket 3, while at the same time securing fulcrum pin 19 in bore 16, such that sufficient length projects therefrom to support coil portion 27 of spring 5, depending upon the number of helical windings of the coil portion. The hooked end 34 of leg 31 is latched over a section of web 21 where the web is formed with an opening 35 that provides access to rivet 14 following installation of handle member 2 on socket 3. It will be appreciated from FIG. 3 that the bottom of this access opening 35 in web 21 lies generally in plane Z when handle member 2 is in its locked position, as shown. Whereas legs 30, 31 of spring 5 ar co-planar in the free state, as shown in FIG. 5, it can be seen from FIG. 3 that when assembled with locking handle assembly 1, legs 30, 31 are forced to assume an angular disposition relative to each other. This results in spring 5 being placed under tension in its assembled state to pre-load handle member 2 in its normal locked position. The amount of spring force exerted on handle member 2 is sufficient to prevent typical shock forces experienced in railway service from vibrating handle 2. Even when the angle cock is mounted such as to locate handle member 2 either side ways to, or on the under side of the angle cock body 6, such that the force of gravity is acting to unlock the handle, the force exerted by spring 5 will prevent unintentional displacement of handle member 2 to an unlocked position, except when manually displaced.

When it is desired to open or close the angle cock, for example, a trainman can overcome the force exerted by spring 5 without undue effort to raise handle member 2 from its normally locked position to its unlocked position, in which the handle locking lugs 24 clear the respective cover stops 25, 26 to permit handle rotation. Upon release of handle member 2 following handle rotation to the desired open or closed valve position, spring 5 is effective to force handle member 2 to return to its locked position and to maintain the integrity of the selected angle cock setting.

Finally it can be noted that the terminus segment 33 has a tapered end 36 and that index hole 28 in fulcrum pin 19 has a chamfer 37, so that during installation of spring 5, proper alignment of fulcrum pin 19 in bore 16 and insertion of terminus segment 33 will be facilitated.

It will also be noted that during disassembly or removal of spring 5, a screw driver or similar tool can be wedged in the space between handle connecting lug 25 and bight portion 32 of spring 5, in order to pry terminus segment 33 out of engagement with aligned pilot hole 29 and index hole 28. In that this tends to bend terminus segment 33 in an arcuate path, it will be appreciated that in cocking terminus segment 33 at a slight angle to bight portion 32, such as angle X, the opportunity for terminus segment 33 to bind in openings 28, 29 during disassembly is eliminated.

What is claimed is:

1. For a valve device having valve means in the body thereof rotatably operable by a handle member to open and closed valve positions delimited by stop means formed on said body, there is provided a locking handle assembly comprising:
   (a) a socket member fixed to a stem of said valve means that projects from said body;
   (b) a mounting lug formed on said socket member;
   (c) a fulcrum pin on said mounting lug;
   (d) said handle member being pivotally connected by said fulcrum pin to said mounting lug to permit raising said handle member from said body to an unlocked position and lowering said handle member toward said body to a locked position;
   (e) a lug on said handle member engageable with said stop means in said locked position of said handle member and disengageable from said stop means in said unlocked position of said handle member; and
   (f) a helical torsion spring carried on said fulcrum pin comprising:
      (i) a coil portion having at least one helical winding through which said fulcrum pin passes; and
      (ii) first and second legs extending from said coil portion, said first leg being fixed relative to said socket member and said second leg engaging said handle member to urge said handle member toward said locked position under tension.

2. A locking handle assembly as recited in claim 1, further comprising a pilot hole in said mounting lug in which said first leg of said torsion spring is contained to provide said fixed relationship with said socket member.

3. A locking handle assembly as recited in claim 2, further comprising:
   (a) a bore in said mounting lug having an axis perpendicular to the axis of said socket member, said fulcrum pin being disposed in said bore; and
   (b) the axis of said pilot hole being in a plane that includes the axis of said bore and which is perpendicular to the axis of said socket member.

4. A locking handle assembly as recited in claim 3, wherein said second leg of said torsion spring engages said handle member at a point that lies substantially in a plane in which the axis of said pilot hole and the axis of said bore lies when said handle member is in said locked position.

5. A locking handle assembly as recited in claim 3, wherein one end of said fulcrum pin projects from said bore in said mounting lug, said projecting one end of said fulcrum pin passing through said at least one winding of said coil portion.

6. A locking handle assembly as recited in claim 5, wherein said projecting one end of said fulcrum pin is beveled.

7. A locking handle assembly as recited in claim 2, wherein said torsion spring in its free state is further characterized by:
(a) said first leg and said second leg being in a plane displaced from the axis of said coil portion; and
(b) said first leg having a terminus segment angularly disposed relative to said plane such that the axis of said terminus segment intersects the axis of said coil portion.

8. A locking handle assembly as recited in claim 7, wherein said plane of said first and second legs is tangent to said at least one helical winding of said coil portion.

9. A locking handle assembly as recited in claim 7, wherein said second leg of said torsion spring is formed with a hooked end to provide said engagement of said second leg with said handle member.

10. A locking handle assembly as recited in claim 7, wherein said first and second legs of said torsion spring extend in opposite directions from said coil portion.

11. A locking handle assembly as recited in claim 7, wherein said first leg of said torsion spring is generally U-shaped.

12. A locking handle assembly as recited in claim 11, wherein said U-shaped first leg comprises said terminus segment and a bight portion intermediate said terminus segment and said coil portion, the included angle between said terminus segment and said bight portion being less than 90°.

13. A locking handle assembly as recited in claim 7, wherein said fulcrum pin comprises an index hole that lies generally perpendicular to the axis of said fulcrum pin, said index hole being aligned with said pilot hole when said fulcrum pin is in a predetermined axial position within said bore of said mounting lug.

14. A locking handle assembly as recited in claim 13, wherein said terminus segment of said first leg is disposed in said index hole to lock said fulcrum pin is said predetermined position.

15. A locking handle assembly as recited in claim 14, wherein said index hole is chamfered.

16. A locking handle assembly as recited in claim 15, wherein the end of said terminus segment is tapered.

* * * * *